(12) United States Patent
Kamiya et al.

(10) Patent No.: US 7,767,603 B2
(45) Date of Patent: Aug. 3, 2010

(54) BASALT FIBER MATERIAL

(75) Inventors: Sumio Kamiya, Toyota (JP); Isao Tanaka, Toyota (JP); Kazumi Imamura, Toyota (JP); Hironori Sasaki, Tsushima (JP); Noriaki Nakagawa, Kasugai (JP)

(73) Assignees: Toyota Jidosha Kabushiki Kaisha, Toyota-shi, Aichi-ken (JP); Nakagawa Sangyo Co., Ltd., Nishikasugai-gun, Aichi-ken (JP)

( * ) Notice: Subject to any disclaimer, the term of this patent is extended or adjusted under 35 U.S.C. 154(b) by 904 days.

(21) Appl. No.: 11/446,136

(22) Filed: Jun. 5, 2006

(65) Prior Publication Data

US 2006/0287186 A1    Dec. 21, 2006

(30) Foreign Application Priority Data

Jun. 6, 2005    (JP)    ............... 2005-165959

(51) Int. Cl.
*C03C 13/06*    (2006.01)
*C03C 6/02*    (2006.01)

(52) U.S. Cl. .............. 501/36; 501/27; 501/25; 501/69

(58) Field of Classification Search .......... 501/35, 501/36, 27, 69
See application file for complete search history.

(56) References Cited

U.S. PATENT DOCUMENTS

| | | | | |
|---|---|---|---|---|
| 3,310,412 A | | 3/1967 | Hofstadt et al. | |
| 3,557,575 A | * | 1/1971 | Beall | .......... 65/33.9 |
| 4,199,336 A | * | 4/1980 | Rittler | .......... 65/376 |
| 4,560,606 A | * | 12/1985 | Rapp et al. | .......... 428/141 |
| 4,764,487 A | | 8/1988 | Lewis | |
| 5,962,354 A | * | 10/1999 | Fyles et al. | .......... 501/36 |

FOREIGN PATENT DOCUMENTS

| | | |
|---|---|---|
| EP | 0705799 A1 | 4/1996 |
| EP | 0957068 A1 | 11/1999 |
| JP | 06-316815 | 11/1994 |
| JP | 2000-515480 | 11/2000 |
| JP | 2003-527287 | 9/2003 |
| RU | 2039019 C1 | 7/1995 |
| RU | 2225374 C2 | 9/2003 |
| WO | WO 2005/009911 A2 | 2/2005 |

OTHER PUBLICATIONS

Communication and European Search Report for European Application No. EP 06252930.0-2122, mailed Sep. 28, 2006 (4 pages).
Van De Velde, K., et al., "Basalt Fibres as Reinforcement for Composites," available at http://www.basaltex.com/logos/Basalt%20fibres.pdf, published Feb. 13, 2005 (2 pages).

* cited by examiner

*Primary Examiner*—Karl E Group
*Assistant Examiner*—Elizabeth A Bolden
(74) *Attorney, Agent, or Firm*—Finnegan, Henderson, Farabow, Garrett & Dunner, LLP

(57) ABSTRACT

A network former and a glass modifier are formed and maintained by using basalt rock ore, and the crystallization and binding of basalt fiber are inhibited The heat-resistance property of basalt fiber is greatly improved from the conventional 750° C. to 850 or 900° C., and significant cost reduction is achieved over conventional products. Basalt fiber material having basalt rock as a raw material to which one or more kinds of oxide selected from $Al_2O_3$, $SiO_2$, CaO, and MgO is added, and basalt fiber material having two kinds of basalt rock containing different amounts of elements as raw materials are provided.

6 Claims, No Drawings

BASALT FIBER MATERIAL

BACKGROUND OF THE INVENTION

1. Field of the Invention

The present invention relates to basalt fiber that has superior sound-absorbing and heat-resistance properties. More specifically, the invention relates to inexpensive heat-resistant basalt fiber having superior sound-absorbing and heat-resistance properties that can be suitably used for automobile mufflers and the like.

2. Background Art

Automobile mufflers are components for absorbing exhaust noise. They currently employ glass fiber as a sound-absorbing material. As a result of the recent trend toward measures for saving more and more energy in automobile engines and increasingly stringent exhaust gas emission regulations, engine temperature has become higher. This has resulted in the exhaust gas temperature of 800° C. or higher at the muffler. Thus, there is an acute need to provide the sound-absorbing material in mufflers with higher heat-resistance property (to cope with temperatures of 850 to 900° C.).

In an example of the manufacture of heat-resistant glass fiber, E glass fiber is treated with an acid. Specifically, conventional E glass fiber having the composition of 50 to 63 wt. % of $SiO_2$, 12 to 16 wt. % of $Al_2O_3$, 8 to 13 wt. % of $B_2O_3$, 15 to 20 wt. % of CaO+MgO, and trace amounts of $Na_2O$+$K_2O$ is subjected to an immersion treatment using, e.g., a 9 to 12 wt. % concentration of hydrochloric acid at 40 to 70° C. for approximately 30 minutes to several hours. This results in the formation of silica glass in the surface layer portion having a $SiO_2$ content of 80 percent or more by weight, thus providing the fiber with heat-resistance property.

Such acid-treated E glass fiber is advantageous in that it can be easily and cheaply spun due to the large difference between its spinning temperature and liquid-phase temperature. However, as a sound-absorbing material for the mufflers where the exhaust gas temperature can reach 700° C. or higher, the heat-resistance property of the fiber is not sufficient and impractical. While S glass fiber has high heat-resistance property and could be used as a sound-absorbing material, it is very expensive.

JP Patent Publication (Kokai) No. 2001-206733 A discloses a heat-resistant glass fiber suitable for use in the automobile mufflers as a sound-absorbing material where the exhaust gas temperature reaches 800° C. or higher. The glass fiber has a glass composition containing, for the fiber as a whole and in substantial percentage by weight terms, 56% to 58.5% of $SiO_2$, 12 to 17% of $Al_2O_3$, 16 to 27% of CaO, 1 to 9% of MgO, 0 to 1% of $Na_2O$, and 0 to 1% of $K_2O$ and not containing $B_2O_3$ nor $F_2$, where the surface layer portion is formed of silica glass containing 90 wt. % or more of $SiO_2$. The patent document also discloses a heat-resistant glass fiber obtained by subjecting the surface of the glass fiber of the aforementioned composition to an acid treatment with mineral acid.

Meanwhile, basalt filament, which is made from naturally occurring basalt rock ore, is very inexpensive as compared with conventional glass filament. However, when it is used at high temperatures of approximately 750° C. to 900° C., crystalline phase develops from the glass component, resulting in the disappearance of flexibility, peeling at the interface between the crystalline layer and the glass layer, and other problems.

Specifically, these problems are:

(1) Commercially available glass fiber that consists primarily of $SiO_2$, $Al_2O_3$, and CaO suffers from sound-absorbing and durability properties problems when exposed to high-temperature (approximately 800° C.) gas in the exhaust system.

(2) Commercially available glass fiber that consists primarily of $SiO_2$, $Al_2O_3$, and MgO suffers from the sound-absorbing and durability properties problems when exposed to high-temperature (approximately 830° C.) gas in the exhaust system.

(3) Commercially available glass filament is expensive.

(4) Application of basalt fiber using naturally occurring material is being considered to solve the above problems (1) to (3). Typical examples are the two kinds of basalt fiber that are compositionally stable and available in large quantities, namely, an ore (A, for high-temperature applications) having a larger amount of $SiO_2$ and an ore (B, for intermediate-temperature applications) having a smaller amount of $SiO_2$, both of which have approximately the same amount of $Al_2O_3$. Although basalt fiber using ore A as a raw material can be spun into fiber, the resultant basalt fiber has a heat-resistance problem at temperature ranges exceeding 750° C. Ore B, on the other hand, is associated with higher energy cost for mass production of fiber.

(5) Thus, no sound-absorbing glass fiber or heat-insulating component material for automotive applications that satisfies the requirements for heat resistance, low cost, and high durability has been available.

JP Patent Publication (Kokai) No. 2001-315588 A discloses an invention whereby basalt fiber is added in a resin for automobile interior material.

SUMMARY OF THE INVENTION

Researches conducted by the inventors have revealed that the aforementioned problems, which are caused by the use of basalt filament made from naturally occurring basalt rock ore, are due to the following causes.

(1) Partial crystallization of a perfect glass phase develops, and the development of a Ca—Si—O low-melting point crystalline phase causes the fibers to be bound with one another, resulting in solidification and loss of flexibility, with the apparent fiber diameter having increased over the diameter of a single fiber by several folds.

(2) A perfect glass phase is completely transformed into a crystalline phase, resulting in loss of flexibility.

(3) Commercially available glass fiber is manufactured by mixing oxide materials including a glass network former and a network modifier to a predetermined composition and melting the mixture at high temperature, resulting in high manufacturing cost due to the high material cost, the need for the powder-mixing process, and the high material-melting temperature.

(4) Basalt fiber is made from a natural material and therefore its manufacturing cost is lower than that of commercially available glass fiber. Ore B for intermediate temperature has less $SiO_2$ and its viscosity in a high-temperature molten material is low, thereby allowing the manufacture of filament having a fiber diameter of 20 μm or less. However, the glass phase crystallizes at temperature of 750° C. or higher, which makes the material inferior in terms of heat-resistance property. On the other hand, ore A for high temperature can maintain its glass phase at high temperature although crystallization develops at approximately 850° C., and it has high heat-resistance property. However, it has high viscosity at high temperature, which makes it necessary to increase the melting temperature for mass production, resulting in an increase in energy cost.

Therefore, it is an object of the invention to form and maintain a network former and a glass modifier using basalt rock ore, prevent the crystallization and binding of basalt fiber, significantly increase the heat-resistance property of basalt fiber from the conventional 750° C. to 850 or 900° C., and achieve a significant cost reduction over conventional products.

The inventors have realized that the crystallization and binding of basalt fiber can be inhibited and a significantly improved heat-resistance property can be achieved by selecting the oxide for the network former and the glass modifier with respect to basalt rock ore and optimizing their amounts added. Thus, the invention has been achieved.

In one aspect, the invention provides a basalt fiber material, using basalt rock as a raw material to which one or more kinds of oxide selected from $Al_2O_3$, $SiO_2$, CaO, and MgO is added.

In the basalt fiber material of the invention, optimum amounts of the oxide added are as follows:

(1) The oxide added consists of one component, of which the amount added, via external addition, is 1.0 to 40 wt. % and preferably 10 to 30 wt. % with respect to 100 wt. % of the basalt rock.

(2) The oxide added consists of two components, of which the sum of the amounts added, via external addition, is 1.0 to 70 wt. % and preferably 10 to 60 wt. % with respect to 100 wt. % of the basalt rock.

(3) The oxide added consists of three or more components, of which the sum of the amounts added, via external addition, is 1.0 to 60 wt. % and preferably 10 to 50 wt. % with respect to 100 wt. % of the basalt rock.

In a second aspect, the invention also provides a basalt fiber material, using two kinds of basalt rock containing different amounts of elements as raw materials. In the invention, two kinds of basalt rock containing different amounts of elements refer to a high-temperature basalt rock ore (hereinafter referred to as "ore for high temperature") having Si element content of about 28.7 wt. % and $SiO_2$ of about 61.5 wt. %, and an intermediate-temperature basalt rock ore (hereinafter referred to as "ore for intermediate temperature") having Si element content of about 26.0 wt. % and $Al_2O_3$ of about 16.5 wt. %.

In a third aspect, the invention also provides a basalt fiber material, using two kinds of basalt rock containing different amounts of elements as raw materials to which one or more kinds of oxide selected from $Al_2O_3$, $SiO_2$, CaO, and MgO is added.

As in the basalt fiber material of the first invention, optimum amounts of the oxide added are as follows:

(1) The oxide added consists of one component, of which the amount added, via external addition, is 1.0 to 40 wt. % and preferably 10 to 30 wt. % with respect to 100 wt. % of the basalt rock.

(2) The oxide added consists of two components, of which the sum of the amounts added, via external addition, is 1.0 to 70 wt. % and preferably 10 to 60 wt. % with respect to 100 wt. % of the basalt rock.

(3) The oxide added consists of three or more components, of which the sum of the amounts added, via external addition, is 1.0 to 60 wt. % and preferably 10 to 50 wt. % with respect to 100 wt. % of the basalt rock.

In a fourth aspect, the invention provides a heat-resistant, sound-absorbing material comprising the aforementioned basalt fiber material.

In a fifth aspect, the invention provides a muffler comprising the aforementioned basalt fiber material as a heat-resistant, sound-absorbing material.

Furthermore, in accordance with the invention, the crystallization and binding of basalt fiber can be inhibited and heat-resistance property can be greatly improved by properly selecting the oxide for a network former and a glass modifier and optimizing the amount thereof added with respect to basalt rock ore, and using two kinds of basalt rock ore containing different amounts of elements as raw materials, namely, a high-temperature ore (A) containing substantially the same amount of $Al_2O_3$ and a larger amount of $SiO_2$, and an intermediate-temperature ore (B) containing a smaller amount of $SiO_2$.

BEST MODE FOR CARRYING OUT THE INVENTION

Basalt rock (basalt ore) as a raw material for the basalt fiber according to the invention is a kind of igneous rock. Major examples of the constituent mineral include: (1) plagioclase: $Na(AlSi_3O_8)$—$Ca(Al_2SiO_8)$; (2) pyroxene: $(Ca, Mg, Fe^{2+}, Fe^{3+}, Al, Ti)_2[(Si, Al)_2O_6]$; and (3) olivine: $(Fe, Mg)_2SiO_4$. Ukrainian products are inexpensive and good-quality.

Tables 1 and 2 show examples of element ratios (wt. %) and the oxide-equivalent composition ratios (wt. %) determined by ICP analysis (using an inductively coupled plasma spectrometer ICPV-8100 by Shimadzu Corporation) performed on a high-temperature basalt rock ore (for high-temperature applications), an intermediate-temperature basalt rock ore (for intermediate-temperature applications), and a glass consisting of 85% high-temperature ore and 15% intermediate-temperature ore.

TABLE 1

|    | Ore (for high-temp.) (wt %) | Ore (for intermediate-temp.) (wt %) | Ore (for high-temp.) 85 wt % Ore (for intermediate-temp.) 15 wt % (wt %) |
|----|---|---|---|
| Si | 23.5~28.8 | 23.5~28.5 | 25.0~28.8 |
| Al | 8.7~9.3 | 8.7~9.3 | 9.0~9.5 |
| Fe | 6.0~6.6 | 6.0~7.1 | 5.7~6.7 |
| Ca | 4.0~4.5 | 5.6~6.1 | 4.2~4.7 |
| Na | 2.1~2.3 | 1.8~2.0 | 2.0~2.3 |
| K  | 1.4~1.8 | 1.2~1.5 | 1.4~1.9 |
| Mg | 0.1~1.6 | 1.4~3.0 | 1.5~1.7 |
| Ti | 0.4~0.6 | 0.5~0.7 | 0.4~0.6 |
| Mn | 0.1~0.2 | 0.1~0.2 | 0.1~0.2 |
| P  | 0.05~0.10 | 0.05~0.09 | 0.07~0.10 |
| B  | 0.02~0.08 | 0.01~0.06 | 0.03~0.10 |
| Ba | 0.03~0.05 | 0.03~0.05 | 0.09 |
| Sr | 0.02~0.04 | 0.02~0.04 | 0.02~0.05 |
| Zr | 0.01~0.04 | 0.01~0.04 | 0.01~0.03 |
| Cr | 0.01~0.03 | 0.01~0.03 | 0.01~0.03 |
| S  | 0.01~0.03 | 0.01~0.03 | 0.01~0.03 |

TABLE 2

|    | Ore (for high-temp.) (wt %) | Ore (for intermediate-temp.) (wt %) | Ore (for high-temp.) 85 wt % Ore (for intermediate-temp.) 15 wt % (wt %) |
|----|---|---|---|
| $SiO_2$ | 57.1~61.2 | 54.0~58.2 | 57.7~60.6 |
| $Al_2O_3$ | 16.1~19.2 | 14.9~18.1 | 16.5~18.9 |
| $FeO + Fe_2O_3$ | 8.0~9.7 | 8.1~9.6 | 7.7~9.6 |
| CaO | 5.5~6.8 | 7.5~8.8 | 5.8~7.0 |
| $Na_2O$ | 2.8~3.3 | 2.2~2.9 | 2.6~3.2 |
| $K_2O$ | 1.8~2.1 | 1.4~1.8 | 1.8~2.2 |
| MgO | 0.20~2.5 | 1.4~4.8 | 0.2~2.8 |
| $TiO_2$ | 0.7~1.0 | 0.8~1.1 | 0.1~0.3 |
| MnO | 0.1~0.3 | 0.1~0.3 | 0.1~0.3 |
| $P_2O_5$ | 0.1~0.3 | 0.1~0.3 | 0.1~0.3 |
| $B_2O_3$ | 0.1~0.3 | 0.04~0.20 | 0.04~0.30 |

TABLE 2-continued

|     | Ore (for high-temp.) (wt %) | Ore (for intermediate-temp.) (wt %) | Ore (for high-temp.) 85 wt % Ore (for intermediate-temp.) 15 wt % (wt %) |
|---|---|---|---|
| BaO | 0.03~0.07 | 0.02~0.06 | 0.03~0.12 |
| SrO | 0.02~0.06 | 0.02~0.07 | 0.01~0.06 |
| $ZrO_2$ | 0.02~0.05 | 0.02~0.05 | 0.01~0.30 |
| $Cr_2O_3$ | 0.01~0.05 | 0.01~0.05 | 0.01~0.04 |
| SO | 0.01~0.03 | 0.01~0.03 | 0.01~0.03 |

Examples of the invention will be described in the following.

Example 1

Basalt rock (ore for intermediate temperature) that had been ground in a mortar and various types of oxide were mixed with the use of a ball mill for 12 hours. The mixture was heated in an alumina crucible lined with platinum foil at 1430° C. for 4 hours and then slowly cooled, thereby preparing vitrified samples.

After the samples were heat-treated at 800° C., 850° C., and 900° C. for 50 to 200 hours, the presence or absence of crystalline phase and glass phase was examined by X-ray powder diffractometry.

Tables 3 to 8 show the results in which letters A to D represent the following characteristics:

A: glass phase alone

B: more glass phase and less crystalline phase

C: less glass phase and more crystalline phase

D: crystalline phase alone

Superiority in heat resistance is in the order of A>B>C>D, and A and B show practicality in terms of heat resistance.

TABLE 3

| | Basalt rock + $TiO_2$ | | | |
|---|---|---|---|---|
| | Basalt rock alone | 2 wt. % | 5 wt. % | 10 wt. % |
| Vitrification | A | B | B | C |
| 800° C. × 50 Hr | C | C | C | C |
| 850° C. × 50 Hr | C | C | C | C |
| 900° C. × 50 Hr | C | C | C | C |

TABLE 4

| | Basalt rock + $Na_2O$ | | | |
|---|---|---|---|---|
| | Basalt rock alone | 2 wt. % | 5 wt. % | 10 wt. % |
| Vitrification | A | A | A | A |
| 800° C. × 50 Hr | C | C | C | C |
| 850° C. × 50 Hr | C | C | C | C |
| 900° C. × 50 Hr | C | C | C | C |

TABLE 5

| | Basalt rock + $SiO_2$ | | | |
|---|---|---|---|---|
| | Basalt rock alone | 2 wt. % | 5 wt. % | 10 wt. % |
| Vitrification | A | A | A | A |
| 800° C. × 200 Hr | C | B | B | B |
| 850° C. × 200 Hr | C | B | B | B |
| 900° C. × 200 Hr | C | B | C | C |

TABLE 6

| | Basalt rock + $Al_2O_3$ | | | |
|---|---|---|---|---|
| | Basalt rock alone | 2 wt. % | 5 wt. % | 10 wt. % |
| Vitrification | A | A | A | C |
| 800° C. × 200 Hr | C | B | B | C |
| 850° C. × 200 Hr | C | B | B | C |
| 900° C. × 200 Hr | C | B | B | C |

TABLE 7

| | Basalt rock + CaO | | | |
|---|---|---|---|---|
| | Basalt rock alone | 2 wt. % | 5 wt. % | 10 wt. % |
| Vitrification | A | A | A | A |
| 800° C. × 200 Hr | C | B | B | C |
| 850° C. × 200 Hr | C | D | D | D |
| 900° C. × 200 Hr | C | D | D | D |

TABLE 8

| | Basalt rock + MgO | | | |
|---|---|---|---|---|
| | Basalt rock alone | 2 wt. % | 5 wt. % | 10 wt. % |
| Vitrification | A | A | B | D |
| 800° C. × 50 Hr | C | C | C | D |
| 850° C. × 50 Hr | C | C | D | D |
| 900° C. × 50 Hr | C | C | D | D |

The following have been found from the results shown in Tables 3 to 8:

(1) Addition of $TiO_2$ does not result in vitrification, nor does it make it possible to inhibit crystallization after heat treatment.

(2) Addition of $Na_2O$ (addition of $Na_2CO_3$ in the experiment) cannot inhibit crystallization after heat treatment.

(3) While crystalline phase is identified with the addition of $SiO_2$, the development of crystalline phase can be inhibited if the amount of $SiO_2$ added is increased.

(4) While the crystallization inhibiting effect can be increased by increasing the amount of $Al_2O_3$ added, vitrification becomes difficult if the amount becomes excessive.

(5) While crystallization can be inhibited with the addition of CaO in the case of heat treatment at 800° C., crystallization develops rapidly at 850° C. or higher.

(6) Crystallization cannot be inhibited with the addition of MgO, and vitrification also becomes difficult if the amount added is excessive.

Example 2

Basalt rock (ore for intermediate temperature) that had been crushed with the use of a crusher and various types of oxide were mixed in an agate mortar. The mixture was heated in an alumina crucible lined with platinum foil at 1430° C. for 4 hours and then slowly cooled, thereby preparing vitrified samples.

After the samples were heat-treated at 800° C., 850° C., and 900° C. for 50 to 200 hours, the presence or absence of crystalline phase and glass phase was examined by X-ray powder diffractometry.

Tables 9 to 11 show the results in which letters A to D represent the same characteristics as above. A and B indicate superior heat-resistance property, and thus they have practicality.

TABLE 9

|  | Basalt rock alone | Basalt rock + $SiO_2$ 20 wt. % + | |
|---|---|---|---|
|  |  | CaO 10 wt. % | MgO 10 wt. % |
| Vitrification | A | A | A |
| 800° C. × 200 Hr | C | A | B |
| 850° C. × 200 Hr | C | C | C |
| 900° C. × 200 Hr | C | C | C |

TABLE 10

|  | Basalt rock alone | Basalt rock + $Al_2O_3$ 20 wt. % + | |
|---|---|---|---|
|  |  | CaO 10 wt. % | MgO 10 wt. % |
| Vitrification | A | D | C |
| 800° C. × 200 Hr | C | D | C |
| 850° C. × 200 Hr | C | D | D |
| 900° C. × 200 Hr | C | D | D |

TABLE 11

|  | Basalt rock alone | Basalt rock + $SiO_2$ 10 wt. % + $Al_2O_3$ 20 wt. % | Basalt rock + $SiO_2$ 20 wt. % + $Al_2O_3$ 20 wt. % | Basalt rock + $SiO_2$ 15 wt. % + $Al_2O_3$ 25 wt. % | Basalt rock + $SiO_2$ 13 wt. % + $Al_2O_3$ 27 wt. % |
|---|---|---|---|---|---|
| Vitrification | A | A | A | B | B |
| 800° C. × 200 Hr | C | B | A | B | B |
| 850° C. × 200 Hr | C | B | B | C | C |
| 900° C. × 200 Hr | C | C | B | C | D |

The following have been found from the results shown in Tables 9 to 11:

(1) The addition of $SiO_2/Al_2O_3$ oxide completely inhibits crystallization in the case of heat treatment at 800° C. for 200 hours. It also allows a large amount of glass phase to remain and thus inhibits the development of crystalline phase in the case of heat treatment at 850° C. for 200 hours and at 900° C. for 200 hours.

(2) The addition of $SiO_2/CaO$ oxide completely inhibits crystallization in the case of heat treatment at 800° C. for 200 hours. It cannot, however, inhibit crystallization in the case of heat treatment at 850° C. for 200 hours and at 900° C. for 200 hours.

(3) The addition of $SiO_2/MgO$ oxide tends to inhibit crystallization in the case of heat treatment at 800° C. for 200 hours. It cannot, however, inhibit crystallization in the case of heat treatment at 850° C. for 200 hours and at 900° C. for 200 hours.

(4) The addition of $Al_2O_3/MgO$ oxide does not result in vitrification and cannot inhibit crystallization.

(5) The addition of $Al_2O_3/CaO$ oxide does not result in vitrification and cannot inhibit crystallization.

The results showed that the binary oxides that show the effect of inhibiting crystallization, namely, improving heat-resistance property after basalt ore is subjected to heat treatment, can be ordered as follows:

$SiO_2$: 20 wt. %/$Al_2O_3$: 20 wt. %>$SiO_2$/CaO>$SiO_2$/MgO>$Al_2O_3$: 20 wt. %/MgO>$Al_2O_3$: 20 wt. %/CaO. Particularly, it became clear that the addition of 20 wt. % of $SiO_2$ and 20 wt. % of $Al_2O_3$ significantly improves the heat-resistance property of basalt fiber from the current approximately 750° C. to 850 or 900° C.

Example 3

Basalt rock (ore for intermediate temperature) that had been crushed with the use of a crusher and three types of oxide, $SiO_2$, $Al_2O_3$, and MgO, were mixed in an agate mortar. The mixture was heated in an alumina crucible lined with platinum foil at 1430° C. for 4 hours and then slowly cooled, thereby preparing vitrified samples.

After the samples were heat-treated at 800° C., 850° C., and 900° C. for 50 to 200 hours, the presence or absence of crystalline phase and glass phase was examined by X-ray powder diffractometry.

Table 12 shows the results in which letters A to D represent the same characteristics as above. A and B indicate superior heat-resistance property, and thus they have practicality.

TABLE 12

|  | Basalt rock alone | Basalt rock $SiO_2$ 10 wt. % $Al_2O_3$ 20 wt. % MgO 10 wt. % | Basalt rock $SiO_2$ 20 wt. % $Al_2O_3$ 20 wt. % MgO 10 wt. % | Basalt rock $SiO_2$ 30 wt. % $Al_2O_3$ 20 wt. % MgO 10 wt. % |
|---|---|---|---|---|
| Vitrification | A | A | A | A |
| 800° C. × 200 Hr | C | B | A | A |
| 850° C. × 200 Hr | C | D | D | D |
| 900° C. × 200 Hr | C | D | D | D |

Table 12 shows that, in all the compositions to which the three types of oxide, $SiO_2$, $Al_2O_3$, and MgO, had been added, crystallization inhibiting effect was observed in the case of heat treatment at 800° C. However, no inhibiting effect was observed in the case of heat treatment at 850° C. or higher.

Example 4

Basalt rock (ore for intermediate temperature) and basalt rock (ore for high temperature) that had been ground in a mortar were mixed with the use of a ball mill for 12 hours. The mixture was heated in an alumina crucible lined with platinum foil at 1430° C. for 4 hours and then slowly cooled, thereby preparing vitrified samples.

After the samples were heat-treated at 800° C., 850° C., and 900° C. for 50 to 200 hours, the presence or absence of crystalline phase and glass phase was examined by X-ray powder diffractometry.

Table 13 shows the results in which letters A to D represent the same characteristics as above. A and B indicate superior heat-resistance property, and thus they have practicality.

TABLE 13

|   | Basalt rock (for intermediate temp.) 30 wt. % + basalt rock (for high temp.) 70 wt. % | Basalt rock (for intermediate temp.) 20 wt. % + basalt rock (for high temp.) 80 wt. % | Basalt rock (for intermediate temp.) 10 wt. % + basalt rock (for high temp.) 90 wt. % |
|---|---|---|---|
| 800° C. × 200 Hr | B | B | B |
| 850° C. × 200 Hr | B | B | B |
| 900° C. × 200 Hr | B | B | B |

From the results shown in Table 13, it was found that a large amount of glass phase remained and the development of crystalline phase can be inhibited, in the case of heat treatment at 800° C. for 200 hours, 850° C. for 200 hours, and 900° C. for 200 hours, by using two kinds of basalt rock containing different amounts of elements as raw materials, namely, a high-temperature basalt rock ore (for high temperature) having $SiO_2$ of about 61.5 wt. % and an intermediate-temperature basalt rock ore (for intermediate temperature) having $Al_2O_3$ of about 16.5 wt. %.

Example 5

Basalt rock (ore for high temperature) that had been crushed with the use of a crusher and an $Al_2O_3$ oxide were mixed in an agate mortar. The mixture was heated in an alumina crucible lined with platinum foil at 1430° C. for 4 hours and then slowly cooled, thereby preparing vitrified samples.

After the samples were heat-treated at 800° C., 850° C., and 900° C. for 50 to 200 hours, the presence or absence of crystalline phase and glass phase was examined by X-ray powder diffractometry.

Table 14 shows the results in which letters represent the same characteristics as above. A and B indicate superior heat-resistance property, and thus they have practicality.

TABLE 14

| Basalt rock | Ore (for high temperature) 100 wt. % | | | | | | | |
|---|---|---|---|---|---|---|---|---|
| $Al_2O_3$ (wt. %) | 0 | 7.5 | 10.0 | 12.5 | 15.0 | 17.5 | 20 | 30 |
| 800° C. × 200 Hr | B | B | B | B | B | B | B | C |
| 850° C. × 200 Hr | B | B | B | B | B | B | B | C |
| 900° C. × 200 Hr | B | B | B | B | B | B | B | C |

From the results shown in Table 14, it was found that, even in basalt rock (for high temperature), there existed certain amounts of oxide to be added such that a large amount of glass phase remained and the development of crystalline phase can be inhibited in the case of heat treatment at 800° C. for 200 hours, 850° C. for 200 hours, and 900° C. for 200 hours.

In accordance with the invention, the crystallization and binding of basalt fibers can be inhibited, and the heat-resistance property can be significantly improved. As a result, the invention can provide a heat-resistant, sound-absorbing material suitable for mufflers and the like at low cost.

What is claimed is:

1. A basalt fiber material, comprising:
a first basalt rock and a second basalt rock,
each basalt rock containing different amounts of elements as raw materials,
wherein an amount of $SiO_2$ in the first basalt rock is larger than an amount of $SiO_2$ in the second basalt rock.

2. A basalt fiber material, comprising:
a first basalt rock and a second basalt rock,
each basalt rock containing different amounts of elements as raw materials to which one or more oxide selected from $Al_2O_3$, $SiO_2$, CaO, and MgO, is added,
wherein an amount of $SiO_2$ in the first basalt rock is larger than an amount of $SiO_2$ in the second basalt rock.

3. The basalt fiber material according to claim 2, wherein the oxide added consists of one component, of which the amount added, via external addition, is 1 to 40 wt. % with respect to 100 wt. % of the basalt rock.

4. The basalt fiber material according to claim 2, wherein the oxide added consists of two components, of which the sum of the amounts added, via external addition, is 1 to 70 wt. % with respect to 100 wt. % of the basalt rock.

5. The basalt fiber material according to claim 2, wherein the oxide added consists of three or more components, of which the sum of the amounts added, via external addition, is 1 to 60 wt. % with respect to 100 wt. % of the basalt rock.

6. A basalt fiber material, comprising:
basalt rock as a raw material to which an oxide is added,
wherein the oxide added to the basalt rock consists of:
$SiO_2$, of which the amount added, via external addition, is 2 to 40 wt. % with respect to 100 wt. % of the basalt rock, and
$Al_2O_3$, of which the amount added, via external addition, is 1 to 5 wt. % with respect to 100 wt. % of the basalt rock.

* * * * *